Nov. 24, 1931.  F. A. ERNST  1,832,972
PROCESS FOR THE DIRECT SYNTHESIS OF AMMONIA
Filed Nov. 3, 1925
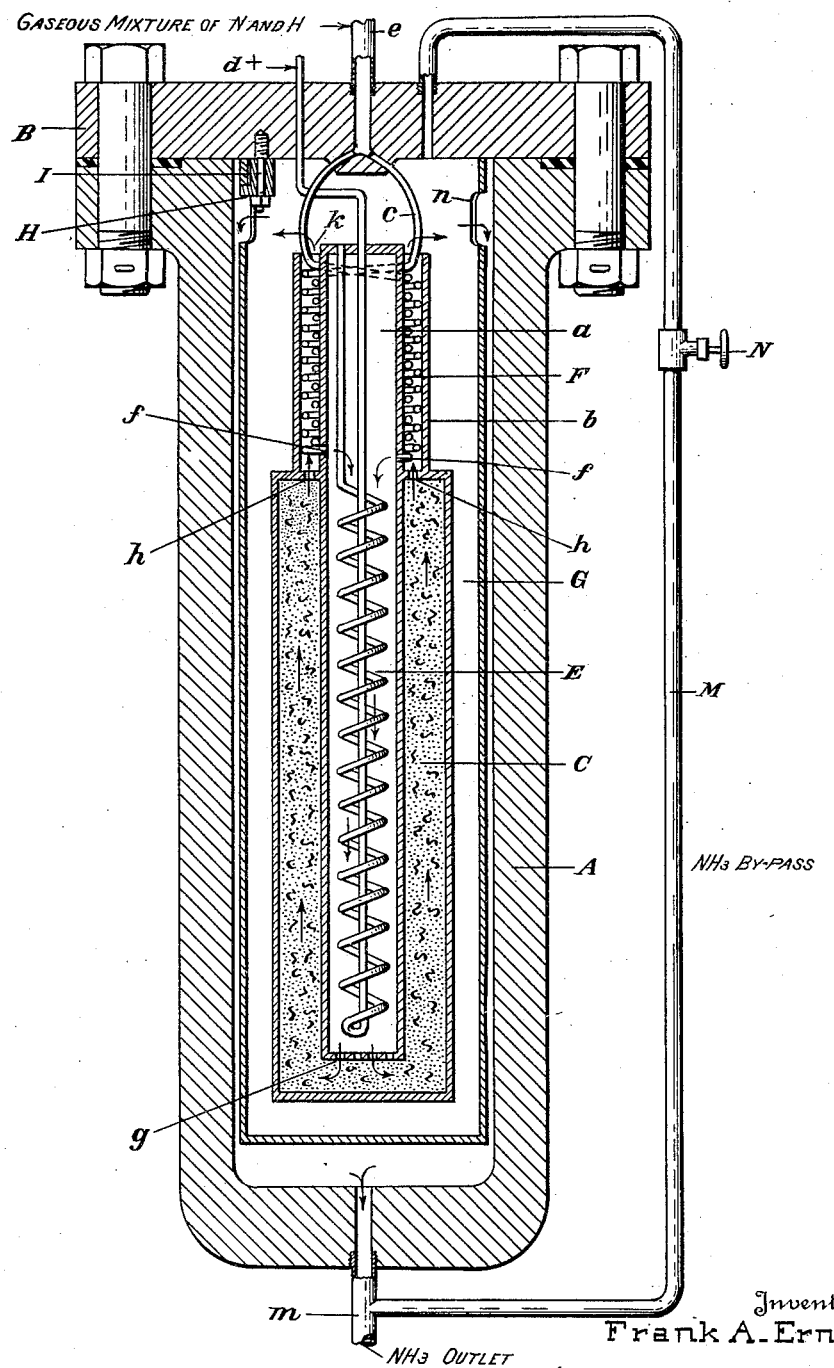
Inventor
Frank A. Ernst
By W. N. Roach.
Attorney Patented Nov. 24, 1931

1,832,972

UNITED STATES PATENT OFFICE

FRANK A. ERNST, OF SOMERSET, MARYLAND

PROCESS FOR THE DIRECT SYNTHESIS OF AMMONIA

Application filed November 3, 1925. Serial No. 66,565.

This invention relates to processes for the direct synthesis of ammonia and particularly to the processes involving the direct synthesis of ammonia from its elements nitrogen and hydrogen by passing said elements, mixed in the proper proportions over a suitable catalyst at an elevated temperature, usually 450° C. and higher, depending on the catalyst used and the pressure at which reaction takes place. The pressures used vary considerably but the common practice at the present time is to use from about 100 to 900 atmospheres.

It is a well known fact to those skilled in the art that hydrogen and ammoniacal gases at elevated temperatures have a deteriorating effect on the metal and therefore on the strength of the pressure sustaining walls of the apparatus used in the processes for the direct synthesis of ammonia. The temperature at which deterioration begins varies for different metals, being about 400° C. for the metals used at the present time. This temperature will, no doubt, be increased in the future with further research in connection with metals to be subjected to these conditions. It is to be here also especially noticed that certain metals, used in the pressure sustaining walls of the apparatus for the processes for the direct synthesis of ammonia, increase in tensile strength with an increase of temperature, up to a temperature of maximum strength which varies for different alloys, being approximately 300° C. for the metals now in use. (See Paper #205, U. S. Bureau of Standards, "Tensile properties of some structural alloy steels at high temperatures", by H. J. French. This temperature of maximum strength will, no doubt, also be increased after further research.

It is then obvious that the temperature of the pressure sustaining wall of the apparatus used in the processes for the direct synthesis of ammonia, should be kept below the temperature at which the deteriorating effect of the gas on the metal begins, but it is further obvious that it would be advantageous for reasons of strength, to maintain the temperature of said walls at nearly the temperature of maximum strength of the material of said walls.

There is another economic reason for maintaining the temperature of said walls as high as is consistent from the standpoint of strength when the process is carried out at the lower pressures, viz. to conserve heat. The heat of reaction is not always entirely sufficient to maintain the necessary temperature for reaction, in which case heat from sources other than that of reaction must be added.

The object of this invention is, therefore, to control the temperature of the pressure sustaining walls of the apparatus used in the processes for the direct synthesis of ammonia within a predetermined range. This object is accomplished in the present invention, first, by bringing all or a part of the outgoing gases, after they have passed over the catalyst, into heat interchanging relation, through a heat interchanger, with the cooler incoming gases, thereby bringing the outgoing gases to an approximate predetermined temperature before they come in contact with the walls of the pressure sustaining apparatus; second, by varying the capacity of heat interchanger.

A still further object of the invention is to maintain the walls of the pressure sustaining apparatus at a predetermined temperature without unduly affecting the temperature of the reaction mass.

The accompanying drawing illustrates an apparatus for carrying out the process of the present invention.

The drawing is a vertical central section.

A pressure sustaining vessel A is provided, closed at its bottom and having a cover B at its top. C refers to the catalyst chamber. E refers to a resistance wire of an electric heater. F indicates a heat interchanger of suitable design, here shown as consisting of a plurality of small tubes having an inner cylindrical wall $a$, an outer cylindrical wall $b$, so as to direct the gases over tubes at a maximum velocity, said tubes being communicatively joined to inlet pipe $c$ and the space surrounding the electric heater. G indicates a cylindrical shell closed at its bottom and supported against the cover B in any suitable way, here shown, by a plurality of clamps H and stud bolts I, and forming an annular space between itself and pressure sustaining wall A, and also forming an annular space between itself and catalyst chamber C. The electric lead to heater E is shown at $d$. M indicates a by-pass communicatively connecting the space within the top of said apparatus to the space within the bottom of the apparatus. A valve N is provided to control the amount of gas by-passed.

The process described in the present invention may be carried out as follows: The catalyst chamber C is filled with a suitable catalyst. An electric current is supplied to heater E and a small amount of hydrogen and nitrogen gas of the desired mixture is admitted at $e$ and allowed to pass through said apparatus and out at $f$ during the heating up process. When the temperature of the catalyst is sufficiently high to promote reaction, the pressure on the apparatus is gradually raised to the operating pressure. The flow of the gases through said apparatus is as follows: From pipe $e$ the gas is conducted through the inside of heat interchanger coils F and out through openings $f$ into the space surrounding the electric heater and downwardly over said heater where the gases are heated to reaction temperature, and from thence through openings $g$ into the lower portion of the catalyst. The gases then pass upwardly through the catalyst and out through openings $h$ into the space around the heat interchanger tubes, continuing upwardly over the outside of said heat interchanger tubes, thus raising the temperature of the incoming gases and lowering the temperature of the outgoing gases to the aforementioned predetermined temperature. From thence all or a part of the gases pass out through the open end $k$ of said heat interchanger, through openings $n$ into the annular space between shell G and pressure sustaining wall A and continue downwardly and out through pipe $m$. The temperature of said walls can be controlled either by changing the capacity of the heat interchanger or by by-passing a portion of the outgoing gases through pipe M. The amount of gas by-passed being controlled by valve N. Or the temperature of said wall can be controlled by both of the above methods simultaneously.

It is to be here especially noted that in the foregoing described process the outgoing gases pass over the heat exchanger after the gases leave the catalyst and before all or a part of the gases come into contact with the pressure sustaining walls of the apparatus, thereby maintaining the desired temperature of the pressure sustaining walls as well as conserving, when necessary, the heat of reaction.

In carrying out the process described herein it is immaterial whether the process is carried out by what is known to those skilled in the art as the cyclical system, or by what is known as the series system.

In either system the nitrogen and hydrogen gases pass through the apparatus over the catalyst where a portion of the gases unite to form ammonia gas which leaves the apparatus mixed with the uncombined hydrogen and nitrogen gas. These gases are then cooled and the ammonia removed. The processes are carried out at substantially a constant pressure. In the recirculating system the uncombined gases are then recirculated through the apparatus by means of a suitable pump, the cycle being repeated as many times as is necessary for the complete conversion of the nitrogen and hydrogen gas into ammonia gas, hydrogen and nitrogen gas being supplied at the operating pressure to make up for the volume of gas converted into ammonia gas and condensed out; while in the series system the gases pass from one unit of the apparatus to another unit in series, the converted portion of gas being removed between each unit, and the unconverted portion of gases being directed into the next unit of said apparatus. A sufficient number of units are joined in series so that practically all of the gases are converted after passing the last unit of the apparatus, after which the remaining gas with impurities is purged to the atmosphere or to suitable containers if it is to be saved for utilization.

Obviously there are other methods of carrying out the present process without departing from the spirit and scope of the present invention, and I do not wish to be understood as limiting myself except as required by the following claims when construed in the light of the prior art.

I claim:

1. In the process of producing ammonia by synthesis of its elements in the presence of a catalyst under elevated temperature and pressure, the method of controlling the temperature of the pressure sustaining walls of the apparatus, which comprises the cooling of the outgoing gases by heat interchange with the incoming gases after said outgoing gases have been passed over a catalyst, then passing a controlled amount of said outgoing gases for substantially the entire length of the pressure sustaining apparatus between the pressure sustaining wall and the catalyst chamber of said apparatus.

2. In the process of producing ammonia by synthesis of its elements in the presence of a catalyst under elevated temperature and pressure, the method of controlling the temperature of the pressure sustaining walls of the apparatus, comprising maintaining the pressure sustaining walls of the apparatus at the temperature of greatest strength of said walls by maintaining the walls out of direct contact with the catalyst and bringing into contact with said walls a controlled amount of the partially cooled resultant gases of the reaction.

3. In the process of producing ammonia by synthesis of its elements in the presence of a catalyst under elevated temperature and pressure, the method of controlling the temperature of the pressure sustaining walls of the apparatus, comprising maintaining the pressure sustaining walls at the temperature of greatest strength of said walls by bringing into heat exchange relation with said walls a controlled amount of cooled resultant gases of the reaction.

4. In the process of producing ammonia by synthesis of its elements in the presence of a catalyst under elevated temperature and pressure, the method of controlling the temperature of the pressure sustaining walls of the apparatus which comprises controlling the temperature of the gaseous mixture by passage through a heat interchanger after such mixture has passed over the catalyst and then bringing a controlled amount of such mixture into contact with said walls.

5. In the process of producing ammonia by synthesis of its elements in the presence of a catalyst under elevated pressure and temperature, the method of controlling the temperature of the pressure sustaining walls of the apparatus which comprises cooling the gaseous mixture by heat exchange with the incoming gases after said gaseous mixture has passed over the catalyst and then bringing a controlled amount of such mixture into contact with said walls.

6. In the process of producing ammonia by synthesis of its elements in the presence of a catalyst under elevated temperature and pressure, the method of controlling the temperature of the pressure sustaining walls of the apparatus which comprises bringing the gaseous mixture to a predetermined temperature by passage through a heat interchanger after such a mixture has passed over the catalyst, and then bringing a controlled amount of such mixture into contact with said walls by passing the mixture between the walls and the catalyst chamber.

7. In the process of producing ammonia by synthesis of its elements in the presence of a catalyst under elevated temperature and pressure, the method of controlling the temperature of the pressure sustaining walls of the apparatus which comprises bringing the gaseous mixture to a predetermined temperature by heat interchange with the incoming gases after such mixture has passed over the catalyst, by-passing a part of said gaseous mixture, and then bringing the remainder of the mixture into contact with the walls.

8. In the process of producing ammonia by synthesis of its elements in the presence of a catalyst under elevated temperature and pressure, the method of controlling the temperature of the pressure sustaining walls of the apparatus which comprises bringing the gaseous mixture to a predetermined temperature by passing the mixture through a heat interchanger after the mixture has passed over the catalyst, by-passing a part of the mixture and then bringing the remainder of the mixture into contact with the walls by passing the said remainder of the mixture between said walls and the catalyst chamber.

FRANK A. ERNST.